United States Patent
Albrecht et al.

(10) Patent No.: US 10,410,091 B2
(45) Date of Patent: Sep. 10, 2019

(54) DETECTING ARTIFACTS BASED ON DIGITAL SIGNATURES

(71) Applicant: International Business Machines Corporation, Armonk, NY (US)

(72) Inventors: Conrad M. Albrecht, White Plains, NY (US); Marcus O. Freitag, Sleepy Hollow, NY (US); Hendrik F. Hamann, Yorktown Heights, NY (US); Sharathchandra U. Pankanti, Darien, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/673,947

(22) Filed: Aug. 10, 2017

(65) Prior Publication Data

US 2019/0050687 A1 Feb. 14, 2019

(51) Int. Cl.
*G06K 9/62* (2006.01)
*G06K 9/46* (2006.01)
*G06K 9/00* (2006.01)

(52) U.S. Cl.
CPC ......... *G06K 9/6265* (2013.01); *G06K 9/0063* (2013.01); *G06K 9/4642* (2013.01); *G06K 9/6212* (2013.01); *G06K 9/6228* (2013.01); *G06K 9/6256* (2013.01); *G06K 9/6267* (2013.01)

(58) Field of Classification Search
CPC .. G06K 9/6265; G06K 9/4642; G06K 9/6212; G06K 9/6256; G06K 9/6228
See application file for complete search history.

(56) References Cited

U.S. PATENT DOCUMENTS

| | | |
|---|---|---|
| 8,175,332 B2 | 5/2012 | Harrington |
| 9,235,334 B2 | 1/2016 | Geis |
| 9,436,784 B2 | 9/2016 | Cunningham |

(Continued)

OTHER PUBLICATIONS

Bodas-Salcedo et al. "COSP: Satellite simulation software for model assessment." Bulletin of the American Meteorological Society 92.8 (2011): 1023.

(Continued)

*Primary Examiner* — Ming Y Hon
(74) *Attorney, Agent, or Firm* — Cantor Colburn LLP; Rahan Uddin (57) ABSTRACT

A computer-implemented method includes receiving one or more training images depicting one or more training geographical regions. One or more environmental characteristic (EC) values are determined for the training images. The EC values include at least one EC value for each of the training images. One or more models are generated for mapping an EC value of an image to a determination of whether an artifact is present in a geographical region depicted by the image, based on the EC values and based on knowledge of which of the training images depict training geographical regions having artifacts present. A new image is received depicting a new geographical region. The models are applied to the new image. A probability that a new artifact is present in the new geographical region depicted in the new image is determined, based on the applying the models to the new image.

20 Claims, 4 Drawing Sheets

(56) References Cited

U.S. PATENT DOCUMENTS

| | | | | |
|---|---|---|---|---|
| 2008/0046184 | A1* | 2/2008 | Bortolot | G06K 9/0063 |
| | | | | 702/2 |
| 2009/0022359 | A1* | 1/2009 | Kang | G06K 9/00657 |
| | | | | 382/100 |
| 2011/0001850 | A1* | 1/2011 | Gaubatz | G06K 9/00228 |
| | | | | 348/241 |
| 2015/0310618 | A1 | 10/2015 | Heege | |
| 2015/0317511 | A1* | 11/2015 | Li | G06K 9/00288 |
| | | | | 382/118 |
| 2015/0371420 | A1* | 12/2015 | Yerushalmy | G06T 3/4038 |
| | | | | 382/284 |
| 2016/0171302 | A1* | 6/2016 | Lavigne | G06K 9/00657 |
| | | | | 382/110 |
| 2018/0189954 | A1* | 7/2018 | Albrecht | G06K 9/00476 |
| 2018/0293671 | A1* | 10/2018 | Murr | G06F 16/583 |

OTHER PUBLICATIONS

Gastellu-Etchegorry et al. "Discrete Anisotropic Radiative Transfer (DART 5) for modeling airborne and satellite spectroradiometer and LIDAR acquisitions of natural and urban landscapes." Remote Sensing 7.2 (2015): 1667-1701.

Gilvear et al., "Detection of estuarine and tidal river hydromorphology using hyper-spectral and LiDAR data: Forth estuary, Scotland." Estuarine, Coastal and Shelf Science 61.3 (2004): 379-392.

Holben et al. "AERONET—A federated instrument network and data archive for aerosol characterization." Remote sensing of environment 66.1 (1998): 1-16.

Jasiewicz et al., "Geo-spatial modelling with unbalanced data: modelling the spatial pattern of human activity during the Stone Age." Open Geosciences 7.1 (2015).

Ostir, "Remote sensing in achaeology—from optical to lidar." ISA SUmmer School, Tours (2007): 25-30.

* cited by examiner

FIG. 4

DETECTING ARTIFACTS BASED ON DIGITAL SIGNATURES

BACKGROUND

The present invention generally relates to object detection and, more specifically, to detecting artifacts based at least in part on digital signatures.

Identifying human-made artifacts, such as walls and handheld tools, at an archeological site can be difficult. Vegetation can grow over these artifacts as time passes. As a result, the artifacts are often not visible to the naked eye, or human access is time consuming and cost intensive, such as in rain forests or other remote locations.

Light Detection and Ranging (LiDAR) is a mechanism of using pulsed lasers to measure distances of objects from a source. LiDAR has been used to scan large geographical areas, such as archeological sites, for exploration. Specifically, LiDAR measurements can be taken to determine variations in surfaces, which can indicate the existence of human-made artifacts underneath vegetation. In some cases, LiDAR measurements are taken after a manual survey to limit the area that needs to be measured.

While LiDAR can sometimes be effective in identifying locations where human-made artifacts are potentially hidden, LiDAR measurements are expensive. Taking LiDAR measurements requires directing a laser systematically across an entire geographical region of interest, which can be time consuming as well. Further, LiDAR is not always as effective as desired, so even if the time and expense can be afforded, the results still may be unacceptable.

SUMMARY

According to an embodiment of this invention, a computer-implemented method includes receiving training image data representing one or more training images depicting one or more training geographical regions. One or more environmental characteristic (EC) values are determined for the training image data. The one or more EC values include at least one EC value for each of the one or more training images. One or more models are generated, using a computer processor, for mapping an EC value of a subset of image data representing an image to a determination of whether an artifact is present in a geographical region depicted by the image, based at least in part on the one or more EC values and based at least in part on knowledge of which of the one or more training images depict training geographical regions having artifacts present. New image data is received representing a new image depicting a new geographical region. The one or more models are applied to the new image data. A probability that a new artifact is present in the new geographical region depicted in the new image is determined, based at least in part on the applying the one or more models to the new image data.

In another embodiment, a system includes a memory having computer-readable instructions and one or more processors for executing the computer-readable instructions. The computer-readable instructions include receiving training image data representing one or more training images depicting one or more training geographical regions. Further according to the computer-readable instructions, one or more environmental characteristic (EC) values are determined for the training image data. The one or more EC values include at least one EC value for each of the one or more training images. One or more models are generated for mapping an EC value of a subset of image data representing an image to a determination of whether an artifact is present in a geographical region depicted by the image, based at least in part on the one or more EC values and based at least in part on knowledge of which of the one or more training images depict training geographical regions having artifacts present. New image data is received representing a new image depicting a new geographical region. The one or more models are applied to the new image data. A probability that a new artifact is present in the new geographical region depicted in the new image is determined, based at least in part on the applying the one or more models to the new image data.

In yet another embodiment, a computer-program product for detecting artifacts includes a computer-readable storage medium having program instructions embodied therewith. The program instructions are executable by a processor to cause the processor to perform a method. The method includes receiving training image data representing one or more training images depicting one or more training geographical regions. Further according to the method, one or more environmental characteristic (EC) values are determined for the training image data. The one or more EC values include at least one EC value for each of the one or more training images. One or more models are generated for mapping an EC value of a subset of image data representing an image to a determination of whether an artifact is present in a geographical region depicted by the image, based at least in part on the one or more EC values and based at least in part on knowledge of which of the one or more training images depict training geographical regions having artifacts present. New image data is received representing a new image depicting a new geographical region. The one or more models are applied to the new image data. A probability that a new artifact is present in the new geographical region depicted in the new image is determined, based at least in part on the applying the one or more models to the new image data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Turning now to an overview of the aspects of the invention, one or more embodiments of the invention provide a mechanism to detect artifacts in a geographical region using multi-spectral satellite images. The images may contain band information, such as from the red, green, and blue (RGB) spectrum, as well as the infrared spectrum, such as near-infrared (NIR) or short-wavelength infrared. Specifically, according to some embodiments, a detection system includes up to three phases, including a training phase, an optional validation phase, and an operation phase. Each of these phases may be performed by a hardware circuit, software, or a combination of hardware and software. In the training phase, both positive image data (i.e., representing positive images of geographical areas known to include an artifact) and negative image data (i.e., representing negative images of geographical regions known to include no artifacts) are analyzed, and for a set of image data corresponding to a respective image, at least one environmental characteristic (EC), such as a vegetation index (VI), is determined by a processor. Based at least in part on the VI values of the image data and the knowledge of which image data is positive and which is negative, one or more models may be generated, by a computer processor implementing machine learning, for determining whether artifacts are present based at least in part on the VI values. In the validation phase, additional image data representing images known to be positive or images known to be negative may be used to refine the models. In the operation phase, image data representing an image may be input, and one or more VI values may be determined for the image data. Based at least in part on application of the models to the one or more VI values, likelihoods of there being artifacts in the geographical regions depicted by the image data may be determined. A user may utilize these likelihoods to decide which locations within the geographical regions to search for artifacts, where that search may include applying more expensive remote sensing techniques, such as LiDAR.

It is assumed that a connection exists between VI values of images and the existence of human-made artifacts in the geographical regions depicted by those images. Human-made artifacts are often hidden by vegetation, and that vegetation may have some shape or structure, which acts as a digital signature within images. The VI value is an indication of that digital signature, and as a result the VI value of a section of an image is likely affected by any artifacts hidden underneath vegetation depicted in that section. Thus, VI values are useful indicators of where artifacts are likely to be found.

Figure 1:
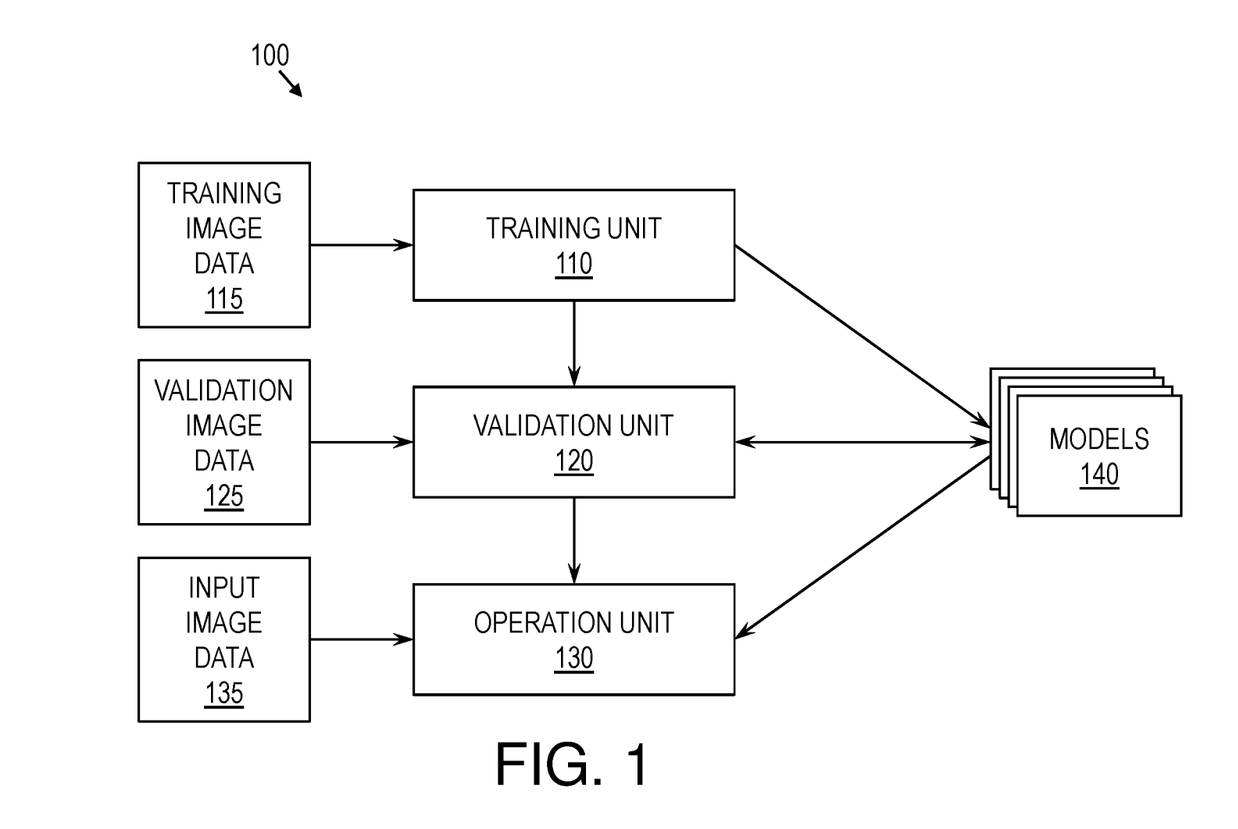
FIG. 1 is a block diagram of a detection system according to some embodiments of this invention.

Turning now to a more detailed description of aspects of the present invention, FIG. 1 illustrates a block diagram of a detection system 100, according to some embodiments of this invention. As shown in FIG. 1, the detection system may include a training unit 110, a validation unit 120, and an operation unit 130, configured and arranged as shown. In some embodiments, the detection system 100 includes two or more phases, including a training phase, an optional validation phase, and an operation phase. Respectively, in some embodiments, the training phase is performed by the training unit 110, the validation phase is performed by the validation unit 120, and the operation phase is performed by the operation unit 130. Generally, the training unit 110 may utilize a computer processor to take training images 115 as input and may generate one or more models 140 mapping VI values or other environmental characteristics to probabilities of artifacts being in the images (i.e., artifacts being the geographical regions depicted by the images); the validation unit 120 may utilize a computer processor to validate the one or more models 140 using validation images 125; and the operation unit 130 may utilize a computer processor to apply the one or more models 140 to input image data 135 to determine probabilities of there being artifacts, such as human-made artifacts, in that input data 135 representing input images. It will be understood that the training unit 110, the validation unit 120, and the operation unit 130 are shown in FIG. 1 as being distinct for illustrative purposes only, and these components may share hardware, software, or both.

The training phase may be applied to training image data 115, each set of which may form a training image depicting one or more geographical regions that have previously been surveyed, such as manually or by LiDAR. Because artifacts may be covered by vegetation, the existence of an artifact within a geographical region may not be immediately obvious to the human eye. However, the survey may have indicated a location of each artifact in each geographical region. For example, and not by way of limitation, these locations may be marked as survey data within a Global Information System (GIS), such that the marked locations corresponding to identified artifacts in the one or more geographical regions.

The detection system 100 may obtain the training image data 115, which may be data representing satellite images, for example, corresponding to the one or more geographical regions that were surveyed. In some embodiments, this training image data 115 is input into the detection system 100 by a user. However, in some embodiments, the training image data 115 is downloaded automatically based at least in part on the global position of the one or more geographical regions, such that each set of training image data 115 representing a training image selected for download corresponds to a location within the one or more geographical regions. Each training image may depict a geographical region that has been surveyed, and further each such geographical region may be a portion of a larger geographical region depicted across various training images. Because the training images depict geographical regions that have already been surveyed, the detection system 100 may thus be aware of which training images are positive (i.e., depict geographical regions in which an artifact is hidden) or negative (i.e., depict geographical regions in which no artifact is hidden).

As needed, the training image data 115 corresponding to the training images may be normalized, or geometrically corrected. As obtained, each training image need not have been captured from directly above the corresponding geographical region. Thus, the various training images associated with a geographical region may have been taken from various angles and thus are not likely to geometrically align with one another in their originally obtained form. Normalization may adjust one or more of the training images, such that after normalization each training images is geometrically aligned with other training images of the same geographical region, thus giving the appearance that each training image was captured from the same angle as the other training images of the same geographical region.

One or more values representing environmental characteristics, such as VI values, may be determined for each set of training image data 115 corresponding to a training image, and each VI value or other environmental characteristic value may be stored in a storage device and associated with the training image data 115 from which it was determined. It will be understood by one skilled in the art that, although this disclosure occasionally refers to VI, other environment characteristics may be used in addition to or as an alternative to VI.

In some embodiments, a single VI value is calculated for the set of training image data 115 corresponding to each training image. However, in some embodiments, each set of training image data 115 may be divided into one or more image sections, each representing a piece of a respective training image, such as by way of a virtual grid. A VI value is calculated for each image section. In that case, a training image may have multiple corresponding VI values, each associated with an image section of the image. It will be understood that computation time is likely to increase as a greater number of VI values are calculated for each training image. However, a greater number of VI values per training image is also likely to lead to more refined and potentially more accurate results.

In some embodiments, the VI values calculated are normalized difference vegetation index (NDVI) values, which may be equal to (NIR−R)/(NIR+R), where R represents the red channel. In some embodiments, for additional examples, the VI used is equal to NIR/R, which can quantify a vegetation's leaf area; NIR/G, which is sensitive to chlorophyll, and where G represents the green channel; or NIR/SWIR, which is impacted by a canopy's water content, and where SWIR represents a short-wave infrared value. In some embodiments, the VI values are normalized, and this normalization of the VI values may occur by subtracting an expected value, such as a geo-spatial (i.e., local) mean value of the VI, from each individual observed VI value. This difference resulting from the subtraction is relevant because, in practice, the existence of artifacts can impact fluctuations in the VI from the geo-spatial mean value, rather than affecting the absolute value of the VI at a given location (i.e., the VI calculated for an image section of a given location).

In some embodiments, a physical model of the VI may be obtained. For example, this physical model may be calculated by or provided to the detection system 100. The physical model may be based on, for example, geo-spatial information such as weather data (e.g., an evapotranspiration model) and elevation (e.g., a physical runoff model). In that case, a pVI value may exist for each image section, where that pVI value may be the expected value of the VI based on the physical model. Further, in that case, the detection system 100 may use a normalized VI that is the difference between an observed VI (oVI), determined based on actual data describing an image section, and the pVI, which is an expected value determined from the physical model. When an image section represents a location with an artifact, the oVI of that image section may differ greatly from the pVI of the location, and this this normalized value may be significant.

After calculation of the VI values, which may be normalized values, it may then be known for each set of training image data 115, based on whether the set is known to be positive or negative, whether an artifact exists in the training image data 115 as well as one or more VI values associated with the training image data 115. Based at least in part on this information, the detection system 100 may generate one or more models 140 for determining whether an image is positive or negative based at least in part on its corresponding VI values.

In some embodiments, the one or more models 140 are generated by way of machine learning based at least in part on the NVDI values and knowledge about which training images are positive and which are negative. Various mechanisms are known in the art for generating models from values associated with positivity and negativity, and one or more such known mechanisms may be used by the detection system 100. Generally, each model 140 determined may map each image section to a probability. The level of refinement in that probability may vary from model 140 to model 140. For example, and not by way of limitation, a model 140 that determines a Boolean value for each image section may essentially provide a probability of either 0% or 100% for each image section. One such model 140, for example, may establish a threshold VI value, such that a first image section having a VI value below that threshold is assigned a first result, while a second image section having a VI above that threshold is assigned a different result.

If multiple models 140 are generated, the one or more models 140 may differ from one another in various ways, and each model 140 need not be based on all the training images. For example, the models 140 may vary in the degree of refinement, such that a first model 140 uses training images divided into image sections that correspond to a first square footage within corresponding geographical regions, which a second model 140 uses training images divided into image sections that correspond to a second square footage within corresponding geographical regions. For such differences to occur, the training images may be divided into image sections a first time for generating the first model 140 and then a second time for generating the second model 140. For another example, two models 140 may be based on different machine learning techniques and may thus yield different results.

The validation phase may be used to validate the one or more models 140 generated in the training phase, or to revise those models 140 as needed. To this end, the validation phase may include some tasks similar to those performed in the training phase, except that these tasks may be performed using different images, specifically validation image data 125 representing validation images.

As in the training phase, the validation phase may include obtaining image data, which in this case is validation image data 125 representing validation images, depicting a geographical region that has been surveyed. The validation images may include both positive and negative images. The detection system 100 may normalize the validation images as needed. For each validation image, the detection system 100 may determine one or more VI values, as described above with respect to the training phase.

The one or more models 140 generated in the training phase may be applied, by a computer processor, to the VI values of the validation images. In some embodiments, each model 140 may determine whether, or with what probability, a validation image includes an artifact. These determinations may be compared with actual knowledge of the validation images, each of which is known to be either positive or negative. The results of these comparisons may be used to adjust the one or more models 140, such as by adjusting a threshold VI value by a model 140. For example, and not by way of limitation, if a model 140 gives a significant percentage of false positives, then a threshold VI value of that model 140 may be modified to result in reduced positives, while if the model 140 gives a significant percentage of false negatives, then the threshold VI value may be modified to result in fewer negatives and more positives.

Figure 2:
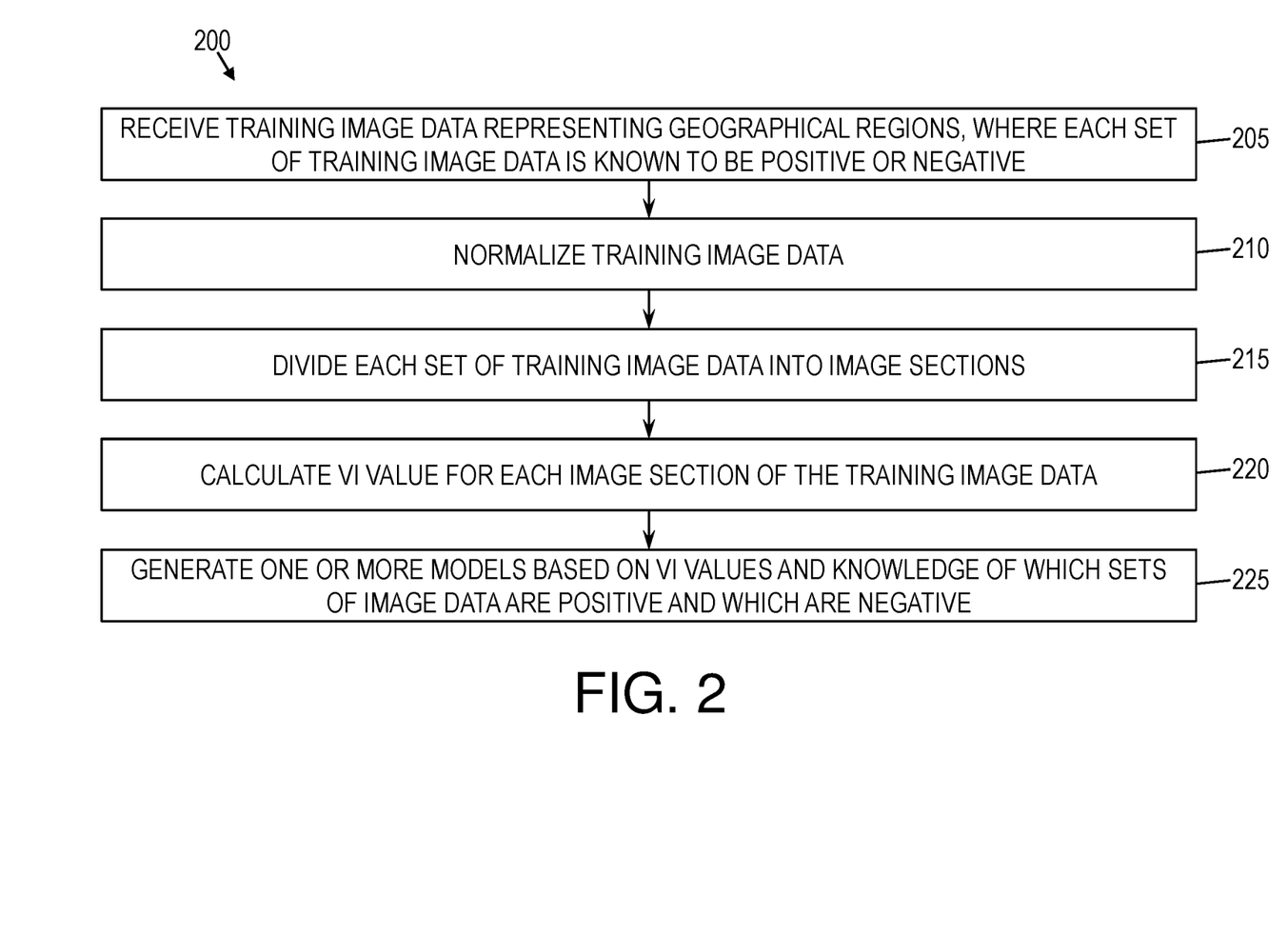
FIG. 2 is a flow diagram of a method for training one or more models used to detect artifacts according to some embodiments of this invention.

FIG. 2 is a flow diagram of a method 200 for training in a detection system 100 to detect artifacts, according to some embodiments of this invention. As shown in FIG. 2, at block 205, training image data 115 may be received to represent one or more training images of geographical regions, where each training image is known to be either a positive image or a negative image. At block 210, the training images may be normalized. At block 215, each training image may be divided into one or more image sections. At block 220, a VI value may be calculated for each image section of each training image. At block 225, based at least in part on the VI values and the knowledge of whether each training image is positive or negative, one or more models 140 may be generated for mapping the VI value of each image section to a probability of whether an artifact is present in a geographical region depicted by the image section.

The above method illustrates an example of the training phase of the detection system 100. However, it will be understood that a method for the validation phase may be similar, with the exception that different images, referred to as validation images provided in the form of validation image data 125, are used. Further, rather than generating new models 140, the result of the validation phase may be to revise the one or more models 140 generated in the training phase.

After the training phase and the optional validation phase, the one or more models 140 may be put into use in the operation phase. The operation phase may include tasks similar to those performed on the training images in the training phase. However, these tasks may be performed on input image data 135 representing input images not known to be positive or negative. In other words, for an input image analyzed during the operation phase, it may be unknown whether the geographical region depicted in the input image includes an artifact.

In the operation phase, a set of input images may be obtained, as input image data 135, depicting an unexplored geographical region. In some embodiments, the detection system 100 does not have access to survey data associated with these input images, or such survey data is insufficient for determining whether artifacts are in the input images. The set of input images may be normalized as needed. For each input image, one or more VI values may be determined. As discussed above, in some embodiments, the images are divided into image sections, and a VI value is determined for each such image section. Thus, each input image may include one or more image sections, each of which may be associated with a VI value.

The detection system 100 may apply the one or more models 140 to the image sections to determine which image sections have artifacts present. In some embodiments, each model 140 is applied to each image section of each input image. Each model 140 may yield its own result with respect to each image section to which it is applied. For each such image section, the detection system 100 may aggregate the results of the various models 140, and may thus determine whether, or with what probability, an artifact is determined to be in the image section. For example, and not by way of limitation, the various probabilities associated with an image section of an input image by the various models 140 may be averaged to determine a final probability for that image section. Further, in some embodiments, the detection system 100 generates a Boolean value for each image section, where the Boolean value indicates the presence of an artifact if the final probability is greater than a threshold probability, and where the Boolean value indicates the lack of an artifact if the final probability is less than a threshold probability.

Based at least in part on the results of the one or more models 140, a user may decide where to search for artifacts in the geographical regions depicted in the input images. For example, the user may prioritize geographical regions corresponding to image sections that are deemed have the highest probabilities of artifacts. Thus, the detection system 100 can drastically reduce the time needed to detect artifacts, by enabling LiDAR and manual surveying to be avoided.

Figure 3:
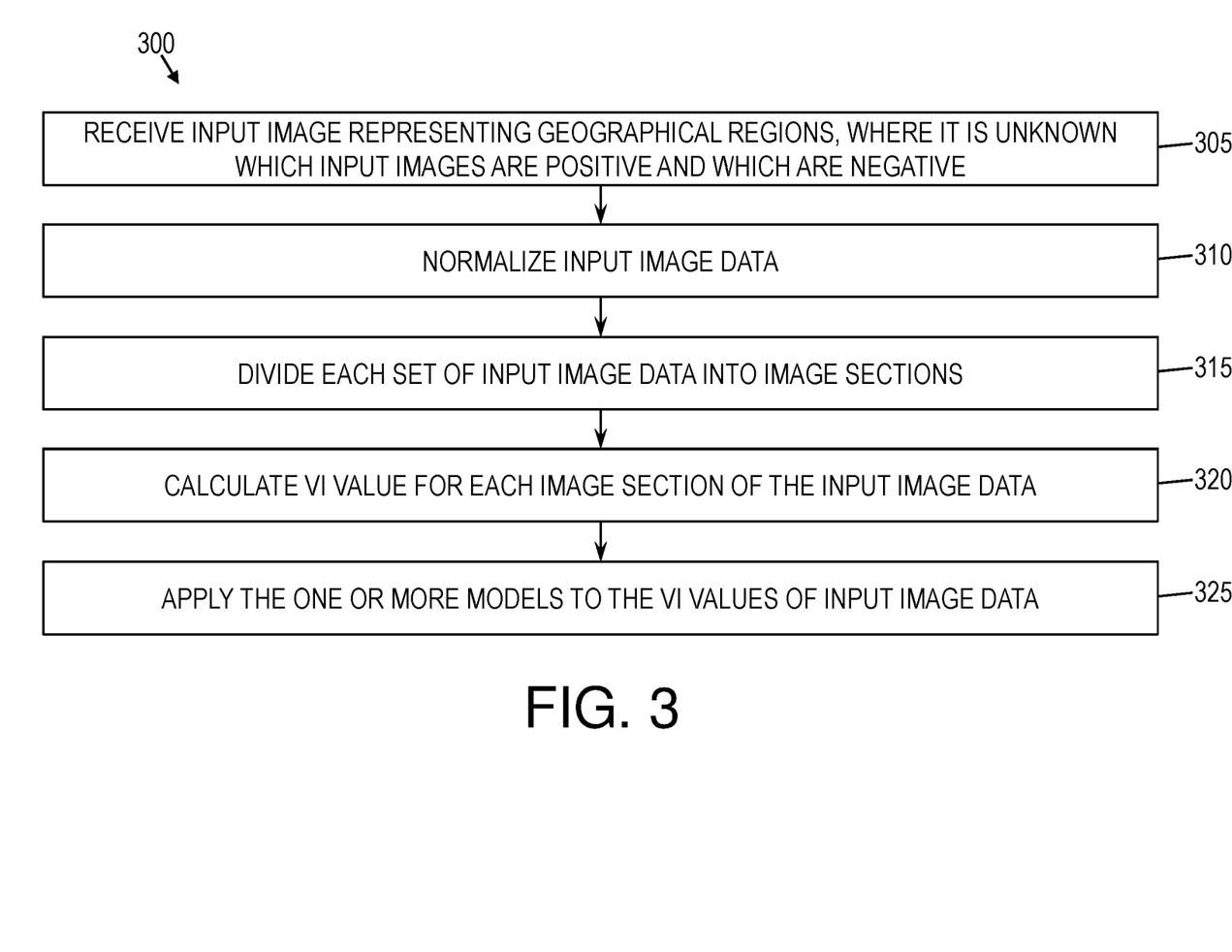
FIG. 3 is a flow diagram of a method for applying one or more models to images to determine a likelihood of there being artifacts in geographical regions depicted in the images according to some embodiments of this invention.

FIG. 3 is a flow diagram of a method 300 for detecting artifacts, according to some embodiments of this invention. As shown in FIG. 3, at block 305, input image data 135 of input images may be received to represent one or more geographical regions, where it is unknown whether artifacts are present in the geographical regions. At block 310, the input images may be normalized. At block 315, each input image may be divided into one or more image sections. In some embodiments, the division into image sections may be performed in the same way as performed in the training phase. In other words, if each training image was divided into image sections each representing ten square feet, then the input images in the operation phase may be divided into image sections representing the same size. Further, if various models are based at least in part on image sections representing spaces of varying sizes, the input images may be divided into image sections in multiple ways so as to satisfy each of such models 140. At block 320, a VI value may be calculated for each image section. At block 325, the one or more models 140 may be applied to the VI values of the various image sections to determine a probability associated with each image section. This probability associated with an image section may represent the likelihood that an artifact would be found in a geographical region corresponding to that image section.

Figure 4:
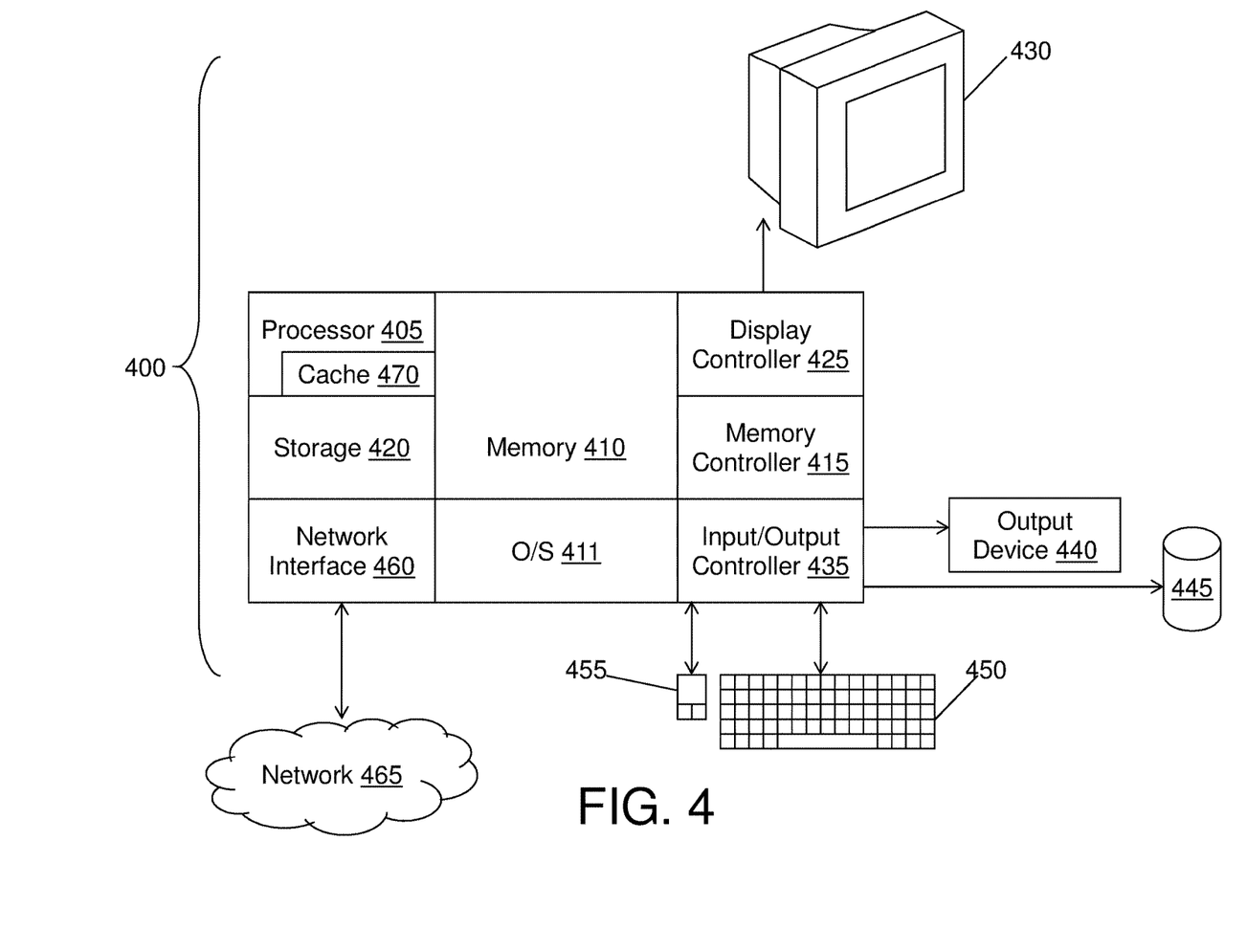
FIG. 4 is a block diagram of a computer system for implementing some or all aspects of the detection system according to some embodiments of this invention.

FIG. 4 illustrates a block diagram of a computer system 400 for use in implementing a detection system 100 or method according to some embodiments. The detection systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the detection systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Detection systems 100 and methods according to this disclosure may be embodied, in whole or in part, in computer program products or in computer systems 400, such as that illustrated in FIG. 4.

Technical effects and benefits of some embodiments include the ability to determine a probability of artifacts existing in a geographical region without having to first survey that region manually or by LiDAR. Specifically, training images may be used to develop one or more models that map VI values to probabilities. Later, the one or more models may be applied to unknown images to determine probabilities of finding artifacts in geographical regions corresponding to the unknown images.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving training image data representing one or more training images depicting one or more training geographical regions;
    determining one or more environmental characteristic (EC) values for the training image data, wherein the one or more EC values comprise at least one EC value for each of the one or more training images;
    generating, using a computer processor, one or more models for mapping an EC value of a subset of image data representing an image to a determination of whether an artifact is present in a geographical region depicted by the image, based at least in part on the one or more EC values and based at least in part on knowledge of which of the one or more training images depict training geographical regions having artifacts present;
    receiving new image data representing a new image depicting a new geographical region;
    applying the one or more models to the new image data; and
    determining a probability that a new artifact is present in the new geographical region depicted in the new image, based at least in part on the applying the one or more models to the new image data.

2. The computer-implemented method of claim 1, wherein the determining the probability that the new artifact is present in the new geographical region comprises aggregating results of the one or more models applied to the new image data.

3. The computer-implemented method of claim 1, wherein the generating the one or more models comprises generating a first model and a second model, and wherein the first model is based on a different machine learning technique than the second model.

4. The computer-implemented method of claim 1, wherein the generating the one or more models comprises generating a first model and a second model, and further comprising:

dividing a first training image of the one or more training images into a first set of image sections corresponding to a first size of a corresponding training geographical region;

wherein the determining the one or more EC values for the training image data comprises determining a respective EC value for each image section in the first set of image sections, and wherein the generating the first model is based on the respective EC values of the first set of image sections; and dividing the first training image of the one or more training images into a second set of image sections corresponding to a second size of the corresponding training geographical region, wherein the second size differs from the first size;

wherein the determining the one or more EC values for the training image data comprises determining a respective EC value for each image section in the second set of image sections, and wherein the generating the second model is based on the respective EC values of the second set of image sections.

5. The computer-implemented method of claim 1, wherein:

the determining the one or more environmental characteristic (EC) values for the training image data comprises determining one or more vegetation indexes for the training image data; and the generating the one or more models for mapping an EC value of a subset of image data representing an image to a determination of whether an artifact is present in a geographical region depicted by the image comprises generating the one or more models for mapping a vegetation index value of a subset of image data representing an image to a determination of whether an artifact is present in a geographical region depicted by the image.

6. The computer-implemented method of claim 1, further comprising:

receiving validation image data representing one or more validation images depicting one or more validation geographical regions, wherein the one or more validation images differ from the one or more training images;

determining one or more validation EC values for the validation image data, wherein the one or more validation EC values comprise at least one validation EC value for each of the one or more validation images; and revising the one or more models for mapping an EC value of a subset of image data representing an image to a determination of whether an artifact is present in a geographical region depicted by the image, based at least in part on the one or more validation EC values and based at least in part on knowledge of which of the one or more validation images depict validation geographical regions having artifacts present.

7. The computer-implemented method of claim 1, wherein the one or more EC values are normalized values, and wherein each EC value of the one or more EC values is calculated by determining a difference between an observed EC value and an expected EC value at a location corresponding to the EC value.

8. A system comprising:

a memory having computer-readable instructions; and one or more processors for executing the computer-readable instructions, the computer-readable instructions comprising:

receiving training image data representing one or more training images depicting one or more training geographical regions;

determining one or more environmental characteristic (EC) values for the training image data, wherein the one or more EC values comprise at least one EC value for each of the one or more training images;

generating one or more models for mapping an EC value of a subset of image data representing an image to a determination of whether an artifact is present in a geographical region depicted by the image, based at least in part on the one or more EC values and based at least in part on knowledge of which of the one or more training images depict training geographical regions having artifacts present;

receiving new image data representing a new image depicting a new geographical region;

applying the one or more models to the new image data; and determining a probability that a new artifact is present in the new geographical region depicted in the new image, based at least in part on the applying the one or more models to the new image data.

9. The system of claim 8, wherein the determining the probability that the new artifact is present in the new geographical region comprises aggregating results of the one or more models applied to the new image data.

10. The system of claim 8, wherein the generating the one or more models comprises generating a first model and a second model, and wherein the first model is based on a different machine learning technique than the second model.

11. The system of claim 8, wherein the generating the one or more models comprises generating a first model and a second model, and the computer-readable instructions further comprising:

dividing a first training image of the one or more training images into a first set of image sections corresponding to a first size of a corresponding training geographical region;

wherein the determining the one or more EC values for the training image data comprises determining a respective EC value for each image section in the first set of image sections, and wherein the generating the first model is based on the respective EC values of the first set of image sections; and dividing the first training image of the one or more training images into a second set of image sections corresponding to a second size of the corresponding training geographical region, wherein the second size differs from the first size;

wherein the determining the one or more EC values for the training image data comprises determining a respective EC value for each image section in the second set of image sections, and wherein the generating the second model is based on the respective EC values of the second set of image sections.

12. The system of claim 8, wherein:
the determining the one or more environmental characteristic (EC) values for the training image data comprises determining one or more vegetation indexes for the training image data; and
the generating the one or more models for mapping an EC value of a subset of image data representing an image to a determination of whether an artifact is present in a geographical region depicted by the image comprises generating the one or more models for mapping a vegetation index value of a subset of image data representing an image to a determination of whether an artifact is present in a geographical region depicted by the image.

13. The system of claim 8, the computer-readable instructions further comprising:
receiving validation image data representing one or more validation images depicting one or more validation geographical regions, wherein the one or more validation images differ from the one or more training images;
determining one or more validation EC values for the validation image data, wherein the one or more validation EC values comprise at least one validation EC value for each of the one or more validation images; and
revising the one or more models for mapping an EC value of a subset of image data representing an image to a determination of whether an artifact is present in a geographical region depicted by the image, based at least in part on the one or more validation EC values and based at least in part on knowledge of which of the one or more validation images depict validation geographical regions having artifacts present.

14. The system of claim 8, wherein the one or more EC values are normalized values, and wherein each EC value of the one or more EC values is calculated by determining a difference between an observed EC value and an expected EC value at a location corresponding to the EC value.

15. A computer-program product for detecting artifacts, the computer-program product comprising a computer-readable storage medium having program instructions embodied therewith, the program instructions executable by a processor to cause the processor to perform a method comprising:
receiving training image data representing one or more training images depicting one or more training geographical regions;
determining one or more environmental characteristic (EC) values for the training image data, wherein the one or more EC values comprise at least one EC value for each of the one or more training images;
generating one or more models for mapping an EC value of a subset of image data representing an image to a determination of whether an artifact is present in a geographical region depicted by the image, based at least in part on the one or more EC values and based at least in part on knowledge of which of the one or more training images depict training geographical regions having artifacts present;
receiving new image data representing a new image depicting a new geographical region;
applying the one or more models to the new image data; and
determining a probability that a new artifact is present in the new geographical region depicted in the new image, based at least in part on the applying the one or more models to the new image data.

16. The computer-program product of claim 15, wherein the determining the probability that the new artifact is present in the new geographical region comprises aggregating results of the one or more models applied to the new image data.

17. The computer-program product of claim 15, wherein the generating the one or more models comprises generating a first model and a second model, and wherein the first model is based on a different machine learning technique than the second model.

18. The computer-program product of claim 15, wherein the generating the one or more models comprises generating a first model and a second model, and the method further comprising:
dividing a first training image of the one or more training images into a first set of image sections corresponding to a first size of a corresponding training geographical region;
wherein the determining the one or more EC values for the training image data comprises determining a respective EC value for each image section in the first set of image sections, and wherein the generating the first model is based on the respective EC values of the first set of image sections; and
dividing the first training image of the one or more training images into a second set of image sections corresponding to a second size of the corresponding training geographical region, wherein the second size differs from the first size;
wherein the determining the one or more EC values for the training image data comprises determining a respective EC value for each image section in the second set of image sections, and wherein the generating the second model is based on the respective EC values of the second set of image sections.

19. The computer-program product of claim 15, wherein:
the determining the one or more environmental characteristic (EC) values for the training image data comprises determining one or more vegetation indexes for the training image data; and
the generating the one or more models for mapping an EC value of a subset of image data representing an image to a determination of whether an artifact is present in a geographical region depicted by the image comprises generating the one or more models for mapping a vegetation index value of a subset of image data representing an image to a determination of whether an artifact is present in a geographical region depicted by the image.

20. The computer-program product of claim 15, the method further comprising:
receiving validation image data representing one or more validation images depicting one or more validation geographical regions, wherein the one or more validation images differ from the one or more training images;
determining one or more validation EC values for the validation image data, wherein the one or more validation EC values comprise at least one validation EC value for each of the one or more validation images; and
revising the one or more models for mapping an EC value of a subset of image data representing an image to a determination of whether an artifact is present in a geographical region depicted by the image, based at least in part on the one or more validation EC values and based at least in part on knowledge of which of the one or more validation images depict validation geographical regions having artifacts present.

* * * * *